United States Patent [19]

Simington

[11] 4,104,793
[45] Aug. 8, 1978

[54] SAW CHAIN SHARPENER

[75] Inventor: Jack F. Simington, Chiloquin, Oreg.

[73] Assignee: Simington Products Co., Chiloquin, Oreg.

[21] Appl. No.: 772,344

[22] Filed: Feb. 25, 1977

Related U.S. Application Data

[63] Continuation-in-part of Ser. No. 516,129, Oct. 18, 1974, which is a continuation-in-part of Ser. No. 481,447, Apr. 29, 1975, Pat. No. 3,880,018.

[51] Int. Cl.² .............................................. B23D 63/16
[52] U.S. Cl. ....................................... 30/139; 76/25 A; 76/40
[58] Field of Search ..................... 76/25 A, 40, 43, 74, 76/78; 51/96, 98, 98.5; 30/139.181

[56] References Cited

U.S. PATENT DOCUMENTS

| 2,217,145 | 10/1940 | Stihl | 76/40 |
| 2,811,873 | 11/1957 | Nielsen | 76/40 |
| 3,013,448 | 12/1961 | Deck | 76/40 |
| 3,071,026 | 1/1963 | DeWitt | 76/40 |
| 3,349,645 | 10/1967 | Silvey | 76/40 |
| 3,592,085 | 7/1971 | Arneson | 76/25 A |
| 3,877,324 | 4/1975 | Silvey | 76/40 X |

FOREIGN PATENT DOCUMENTS

| 2,224,993 | 6/1974 | France | 76/25 A |

Primary Examiner—N. P. Godici
Attorney, Agent, or Firm—Clarence A. O'Brien; Harvey B. Jacobson

[57] ABSTRACT

A support is provided and a rotary grinding head is journaled from the support for rotation about a first predetermined axis. A support arm is pivotally mounted at one end from the support for swinging of the support and support arm about a second axis substantially paralleling the first axis and the other free end portion of the support arm includes structure for supporting a saw chain therefrom for successive positioning of the cutting teeth of the chain in predetermined position for sharpening by the grinding wheel. As a result of relative swinging of the support and the support arm, the rotary grinding head is swingable into registry opposite side portions of the supported saw chain. Also, a chain tooth engaging and positioning member is supported from the support arm for establishing the predetermined position of the tooth to be sharpened and is swingable into and out of an operative position. When the rotary grinding head is positioned at one side of the supported saw chain, all of the cutting teeth on that side of the chain may be successively sharpened and when the grinding head is positioned on the opposite side of the supported saw chain, all of the cutting teeth on that side of the chain may be successively sharpened.

9 Claims, 7 Drawing Figures

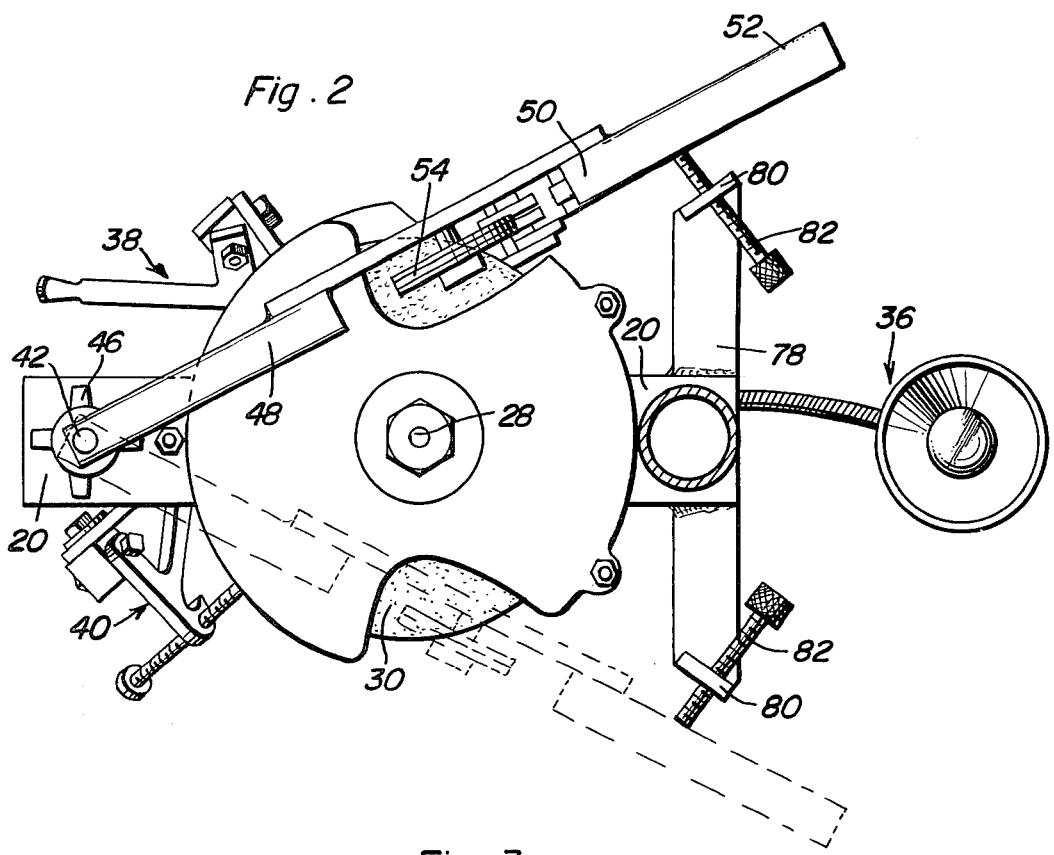
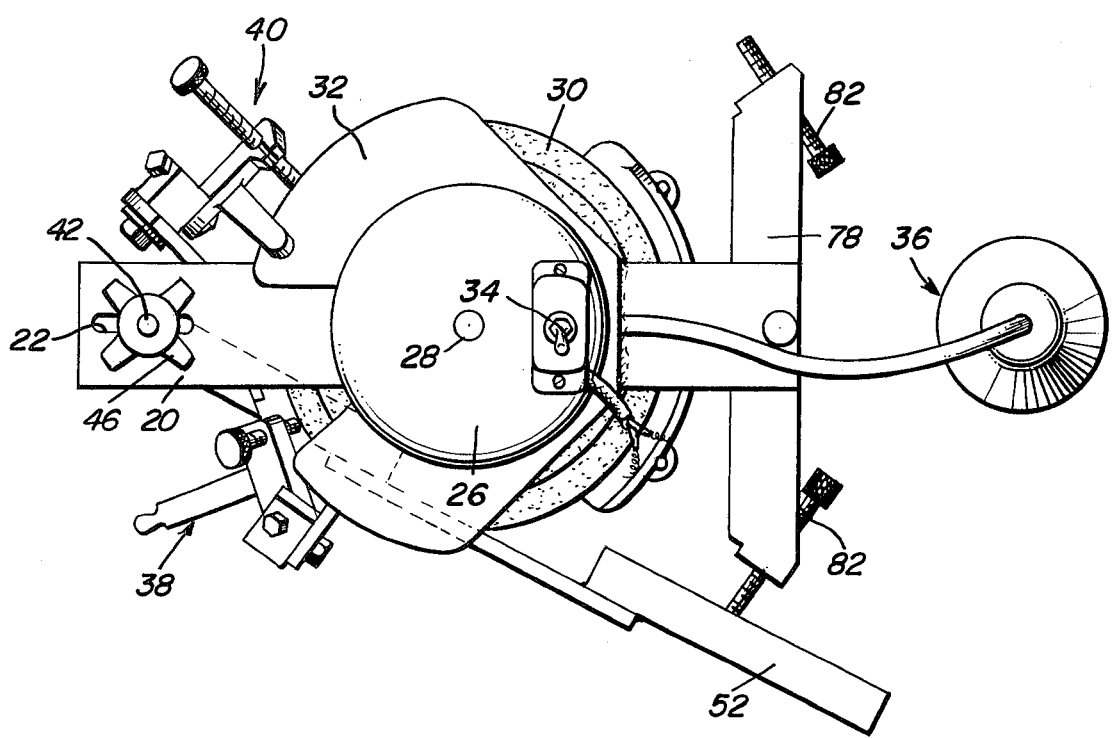

SAW CHAIN SHARPENER

This application comprises a continuation-in-part of my copending U.S. application Ser. No. 516,129 for Chain Saw Sharpener, filed Oct. 18, 1974, which is a continuation-in-part of U.S. Ser. No. 481,447 now Pat. No. 3,880,018, dated Apr. 29, 1975.

BACKGROUND OF THE INVENTION

Heretofore chain saw sharpening devices have been provided whereby both the right and left hand teeth of a saw chain may be sharpened. However, in order to sharpen a chain in a manner such that it may cut in a perfectly even manner, precisely the same bevel and depth of bevel must be formed not only on each cutting tooth on one side of the chain, but the same bevel and depth of bevel must be formed on the cutting teeth on the other side of the chain. The chain saw sharpener and automatic chain sharpener disclosed in my above-mentioned copending application and patent are capable of performing this function and there have been other prior patented chain saw sharpeners which are purported to be capable of also performing this function.

However, these previously designed machines for sharpening saw chains in a manner such that the teeth on opposite sides of the chain will all be sharpened to substantially the same configuration require that the chain to be sharpened be supported on a first support for sharpening the teeth on one side of the chain and then removed for support on a second support for sharpening the teeth on the other side of the chain. This necessary step of transferring the saw chain from one support to a second support in order to sharpen the teeth on both sides of the chain is not only an extra step required in the process of sharpening a saw chain but also raises the opportunity of error in the proper placement of the two chain supports in relation to the rotary grinding head and thus the possibility of the teeth on opposite sides of the chain not being uniformly sharpened unless a proper positioning of the two saw chain supports in relation to the rotary grinding head is checked frequently. Further, the necessity of providing two saw chain supports results in unnecessary duplication of parts and higher cost of manufacture.

Examples of previously patented saw chain sharpening machines including some feature which are similar to various components of the instant invention may be found in U.S. Pat. Nos. 2,217,145, 2,318,456, 2,353,956, 2,410,828, 3,592,085, 3,611,839 and 3,779,103.

BRIEF DESCRIPTION OF THE INVENTION

The saw chain sharpener of the instant invention includes a support from which a rotary grinding head is journaled for rotation about a first predetermined axis. A support arm has one end portion thereof oscillatably supported from the support for angular displacement about a second axis spaced outwardly from the first axis and the other end of the support arm includes support structure for supporting a saw chain to be sharpened and the grinding head is alternately positionable in registry with opposite side portions of the supported saw chain. In this manner, successive teeth on one side of an associated chain may be brought into registry with one side of the rotary grinding head and thereafter successive teeth on the other side of the chain may be successively registered with the other side of the rotary grinding head. Also, the support arm includes tooth engaging and positioning structure operative to adjustably establish stationary, longitudinally displaced positions of the saw chain teeth being sharpened relation to the chain support structure. In a first form of the invention the support for the rotary grinding head comprises a stationary standard relative to which the support arm may be swung and in a second form of the invention the free end of the support arm includes clamp structure for support from a table or floor supported chain saw blade upon which the chain to be sharpened is mounted and the support from which the rotary grinding head is journaled may be swung relative to the support arm.

The main object of this invention is to provide a saw chain sharpener capable of sharpening all of the teeth on a chain on both sides thereof in exactly the same manner.

Another object of this invention, in accordance with the immediately preceding object, is to provide a saw chain sharpening device which may be readily adjusted for use in conjunction with various types of saw chains.

A still further object of this invention is to provide a saw chain sharpening device of the type including a rotary grinding head and provided with means for trueing the rotary grinding wheel of the grinding head and making necessary adjustments to compensate for material removed from the grinding wheel preparatory to again resuming saw chain sharpening operations.

A further object of this invention is to provide a saw chain sharpening device which may be utilized by persons possessing less than the usual amount of skill required to properly sharpen a saw chain.

Yet another object of this invention is to provide a saw chain sharpener in accordance with the preceding objects and including a single saw chain support structure from which the saw chain to be sharpened need not be removed during the process of sharpening all of the teeth on both sides of the saw chain.

A final object of this invention to be specifically enumerated herein is to provide a saw chain sharpening device in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a horizontal sectional view taken substantially upon the plane indicated by the section line 2—2 of FIG. 1;

FIG. 3 is a top plan view of the saw chain sharpener;

DETAILED DESCRIPTION OF THE INVENTION

Figure 1:
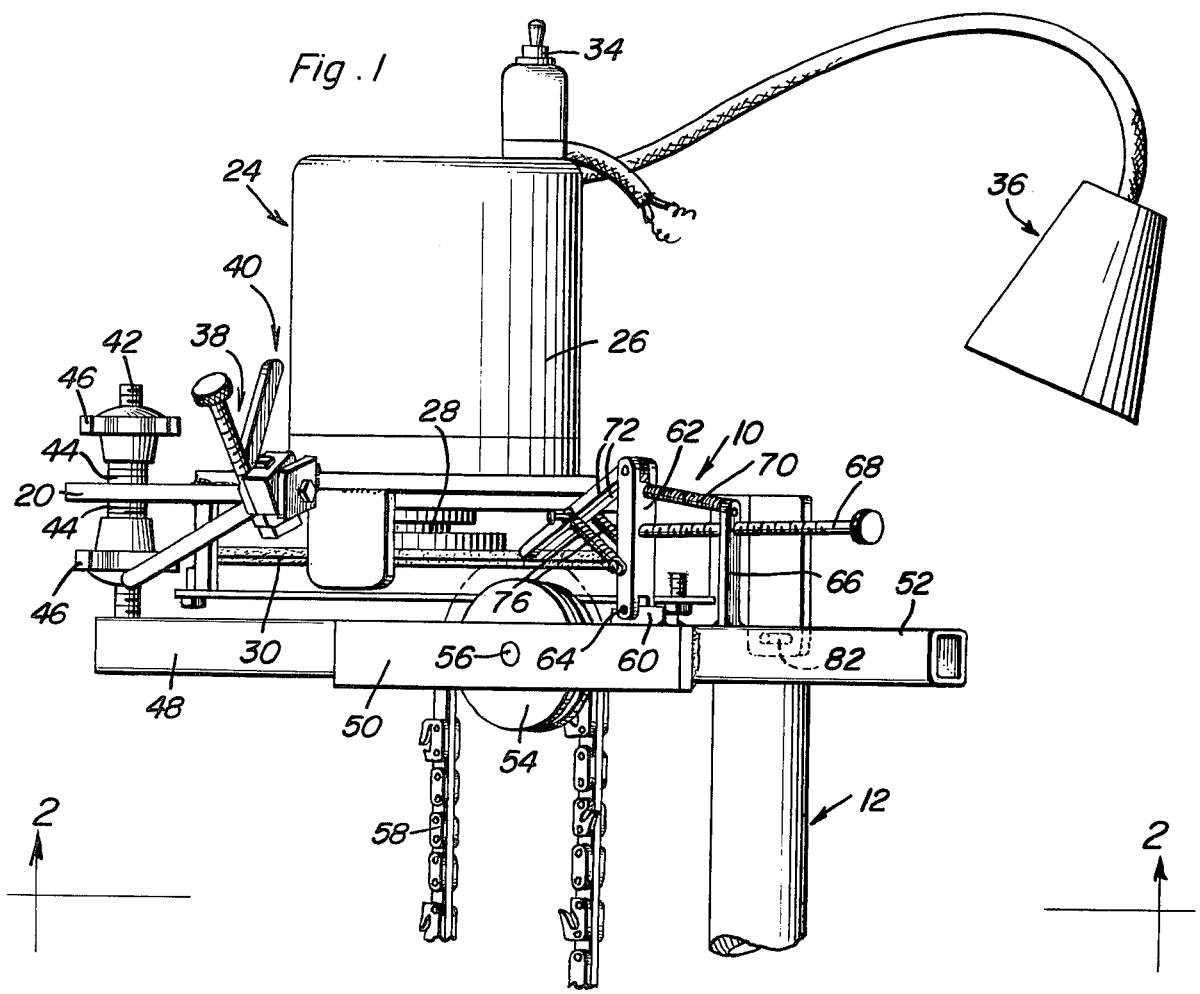
FIG. 1 is a side elevational view of a first form of saw chain sharpening machine of the instant invention illustrating a saw chain to be sharpened supported therefrom.
Figure 6:
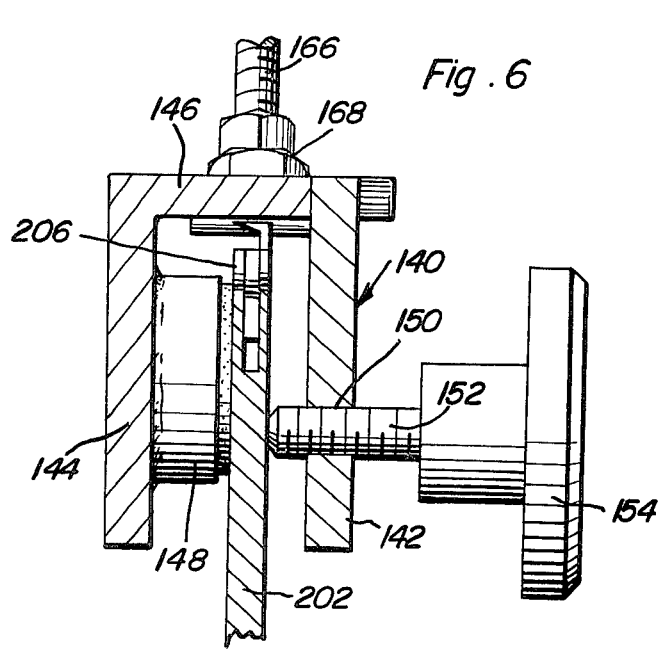
FIG. 6 is an enlarged fragmentary sectional view taken substantially upon the plane indicated by the section line 6—6 of FIG. 5.
Figure 7:
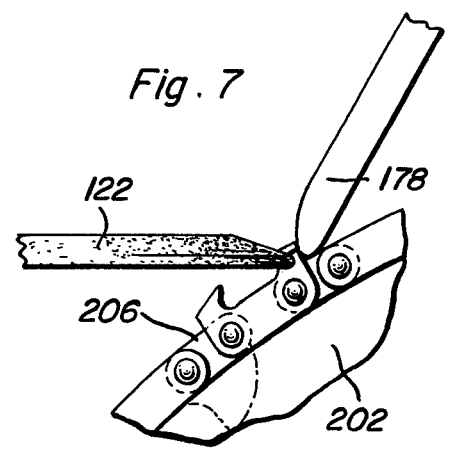
FIG. 7 is a fragmentary enlarged elevational view illustrating the manner in which the machine may properly position a chain saw tooth for sharpening by the rotary grinding head of the machine.

Referring now more specifically to FIGS. 1, 2 and 3 of the drawings, the numeral 10 generally designates the first form of saw chain sharpener of the instant invention. The sharpener 10 includes an upstanding support or standard 12 which may include lower end support legs (not shown).

The upper end of the standard 12 includes a horizontally outwardly directed mounted arm 20 whose outer end portion is longitudinally slotted as at 22 and from whose mid-portion a rotary grinding head assembly referred to in general by the reference numeral 24 is rigidly supported. The rotary grinding head assembly 24 includes a vertically disposed electric motor 26 having a depending rotary output shaft 28 upon which a rotary grinding disk 30 is mounted. The shaft 28 projects through an opening (not shown) provided therefor in the mounting arm 20 and the rotary grinding head assembly 24 includes shield structure 32 for enclosing considerable portions of the grinding disk 28. The motor 26 includes a control switch 34 of the three position type, the motor 26 being of the reversible type, and a lamp structure referred to in general by the reference numeral 36 is electrically connected to the switch 34 for electrical actuation thereby whenever the motor 26 is electrically actuated for rotation in either direction.

The guard structure 32 includes a pair of disk dressing assemblies referred to in general by the reference numerals 38 and 40 for beveling and trueing the outer periphery of the grinding disk 30. The assemblies 38 include more or less conventional structure for movement into and out of operative positions for dressing the grinding disk 30.

A vertical threaded support shank 42 extends downwardly through the slot 22 and is slidable therealong. A plurality of washers 44 are disposed on the shank 42 both above and below the slotted end of the mounting arm 20 and upper and lower hand nuts 46 are threaded on the support shank 42 above and below the upper and lower sets of washers 44. The lower end of the support shank 42 is spaced below the lower hand nut 46 and is rigidly anchored to a first end 48 of a support arm 50. The second end 52 of the support arm 50 defines a handle portion and a centrally grooved support wheel 54 is journaled from an intermediate portion of the support arm 50 by means of a horizontal axle pin 56 disposed at substantially right angles to the longitudinal centerline of the support arm 50. The support wheel 54 may have a saw chain 58 trained thereover for steady support of the chain 58 from the support arm 50 in a manner such that the chain may be adjustably longitudinally advanced to bring successive teeth of the chain into registry with the upper periphery of the support wheel 54.

The support arm 50 includes an upstanding mounting lug 60 thereon between the second end 52 and the support wheel 54 adjacent the latter and the lower bifurcated end of an upstanding arm 62 is oscillatably supported from the mounting lug 60 as at 64. Further, the outer or second end portion 52 of the arm also includes an upstanding support 66 spaced outwardly of the lug 60 and through whose upper portion an adjustment screw 68 is threaded. The adjustment screw 68 is horizontally disposed and extends longitudinally of the support arm 50. One end of the adjusting screw 68 abuts the side of the upper end portion of the upstanding arm 62 remote from the support wheel 54 and an expansion spring 70 is secured between the upper end of the arm 62 and the upper end of the support 66 and yieldingly biases the upper end portion of the arm 62 toward engagement with the adjusting screw 68.

A pair of side-by-side elongated abutment or stop members 72 are oscillatably supported between the furcations of the upper end of the support arm 62 as at 74 and a pair of expansion springs 76 are connected between the free end portions of the abutment members 72 and corresponding lower opposite side portions of the support arm 62. Further, the upper end of the standard 12 includes a horizontal transverse support 78 whose opposite ends include upwardly directed canted flanges 80 through which stop screws 82 are threaded, the stop screws 82 being horizontally disposed and engageable by the free end portion of the support arm 50 on opposite sides of the standard 12 to limit swinging movement of the central portion of the support arm 50 from which the support wheel 54 is journaled toward the outer periphery of the disk 30.

In operation, the saw chain 48 to be sharpened is trained over the support wheel 54 as shown in FIG. 2. The elongated abutment member or link 72 adjacent the mounting arm 20 has its free end swung upwardly and over the support arm 62 toward the free second end 52 of the support arm 50 in order to shift that abutment member 72 to an out-of-the-way position. Then, a selected tooth on the side of the chain 58 remote from the grinding disk 30 may be advanced into sharpening position by advancing the chain 58 in a counterclockwise direction over the support wheel 54 until that saw tooth passes beneath the abutment member 72 retained in the operative position. Then, the chain is slightly reversed in direction until the lower free end of the abutment member 72 abuts the selected tooth and prevents further clockwise movement of the chain 58 while a downward manual pressure is applied thereto as at 84. Then, the adjusting screw 68 is adjusted in conjunction with adjustment of the adjacent screw 82 in order to properly position the selected cutting tooth for engagement with the outer periphery of the disk 30. After proper positioning of the first cutting tooth has been obtained, the arm 50 is swung away from the grinding wheel or disk 30 and the switch 34 is actuated to electrically actuate the motor 26 in order to rotate the disk 30 in the proper direction. Then, the support arm 50 may be moved toward the disk 30 in order to bring the tooth to be sharpened into contact with the rotating disk. If further sharpening is desired, the adjustment screw 82 may be slightly backed off.

After each tooth is sharpened, the support arm 50 is swung slightly away from the disk 30 and the chain 58 is again advanced in a counterclockwise direction and thereafter slightly in a clockwise direction so as to position the next tooth on the outer side of the chain in proper position for sharpening. Then, with downward pressure again being applied to the chain 58 as at 84 the arm 50 is swung back toward the disk 30 whereupon the next tooth to be sharpened is brought into contact with the disk 30.

After all of the teeth on one side of the chain are sharpened, the support arm 50 is swung to the other side of the disk 30 and the teeth on the other side of the chain may be sharpened in substantially the same manner.

According to the type of tooth to be sharpened, the positioning of the support shank 42 along the slot 22 may be adjusted as desired. Further, elevation of the support shank 42 relative to the mounting arm 20 may also be adjusted as desired.

If but a few types of chain saw chains are to be sharpened by the machine 10, the machine 10 may be provided with a free end on the mounting arm 20 corresponding to the slotted end thereof which is disposed lower in elevation and generally at the level of the lower hand nut 46 in FIG. 2. If such a modification is made, the base end of the support arm 50 may be directly supported from such a lower mount without benefit of the vertically adjustable support shank and the equivalent of the slot 22. By this construction, a more rigid pivotal mounting of the support arm 50 will be provided.

The abutment or stop members 72, by their angular relationship with the saw chain teeth engaged thereby define locks to prevent angular displacement of the chain 58 about the axle pin 56 to advance the chain 58 in a direction toward the adjusting screw 68. Further, the springs 76 coact with the stop members 72 to also lock the chain 58 and thus the associated tooth against angular displacement in the opposite direction. Accordingly, each chain tooth to be sharpened is positioned in exactly the same position relative to the grinding disk 30.

With reference now more specifically to FIGS. 4 through 7 of the drawings, the second form of saw chain sharpener is referred to in general by the reference numeral 110. The sharpener 110 includes a mount 112 including an elongated endwise outwardly projecting portion 114 longitudinally slotted as at 116. The mount 112 includes an upstanding journal sleeve 118 through which an upstanding rotary shaft 120 is journaled and the lower end of the shaft 120 has a rotary grinding disk 122 mounted thereon. The mount 112 also includes shield structure 124 for enclosing considerable portions of the grinding disk 122. The shaft 120 is adapted to have any suitable source of rotary torque applied thereto, which source of rotary torque may be in the form of an electric drill chuck or any other suitable electric motor.

The second form of chain sharpener 110 additionally includes a support arm 126 corresponding to the support arm 50 and including an upstanding sleeve portion 128 on one end from which a threaded shank 130 projects upwardly. The shank 130 projects through the slot 116 and has washers 132 disposed thereon between the portion 114 of the mount 112 and the sleeve portion 128 and additional washers 134 disposed thereon above the portion 114. A threaded nut 136 is tightened on the upper end of the shank 130 above the washers 134 and the shank 130 may be adjustably shifted longitudinally of the slot 116 to vary the positioning of the axis of oscillation of the support arm 126 relative to the mount 112 along the portion 114 thereof before the nut 136 is tightened.

The end of the support arm 126 remote from the sleeve portion 128 defines a downwardly opening channel portion referred to in general by the reference numeral 140 including opposite side portions 142 and 144 interconnected at their upper ends by means of a bight portion 146 extending therebetween. The side portion 144 includes a pair of innerside inwardly projecting abutments 148 spaced along the support arm 126 and the side portion 142 includes a threaded bore 150 formed therethrough at a point spaced centrally intermediate the positioning of the abutments 148 along the support arm 126. A clamp stud 152 is threaded through the bore 150 and has a hand wheel 154 on its outer end.

Figure 5:
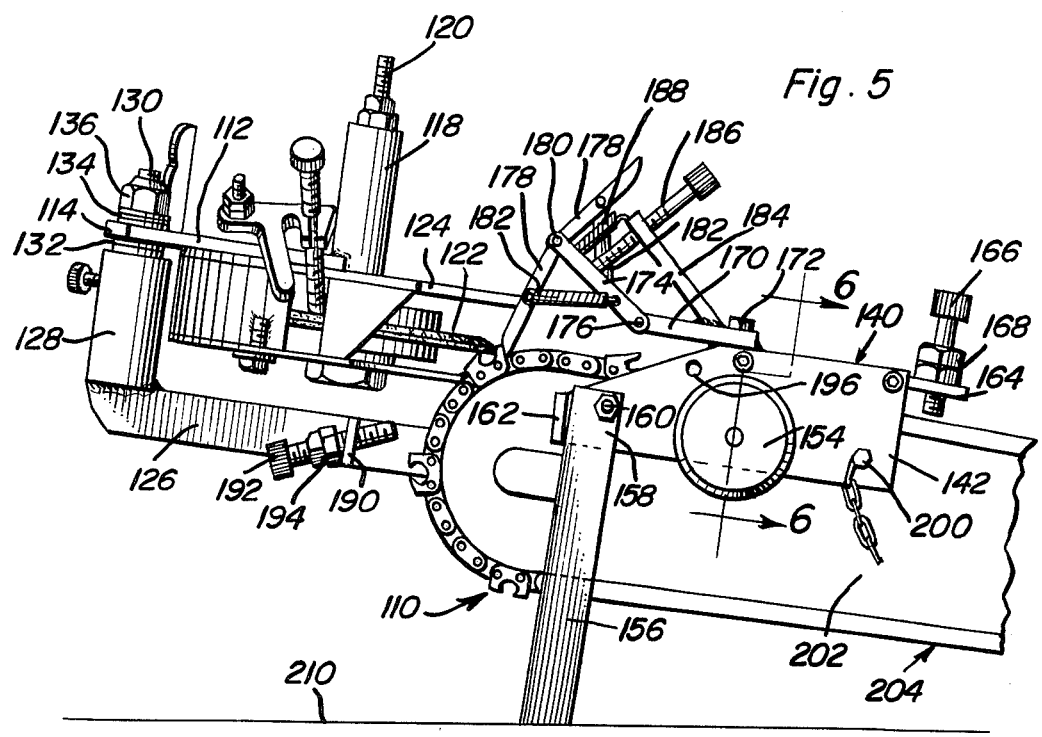
FIG. 5 is a side elevational view of the assemblage illustrated in FIG. 4.

The side portion 144 includes a support leg 156 having one end portion 158 pivotally secured thereto as at 160 and the side portion 144 includes an outwardly directly abutment flange 162 with which the support leg 156 is engageable in the position thereof illustrated in FIG. 5 in order to limit clockwise swinging movement of the leg 156 relative to the channel portion 140. The support leg 156 may be swung from the operative position thereof illustrated in FIG. 5 abuttingly engaged with the flange 162 to a position generally paralleling the support arm 126.

The rear end of the bight portion 146 includes an endwise outwardly projecting extension 164 downwardly through which a stop screw 166 provided with an adjustable abutment 168 is threaded and the forward end portion of the bight portion 146 includes a forwardly projecting mount 170 supported therefrom by means of a fastener 172. A first bifurcated end of an arm 174 corresponding to the arm 62 is pivotally supported from the forward end of the mount 170 as at 176 and a pair of elongated abutment or stop members 178 corresponding to the similar components 72 have corresponding ends thereof pivotally supported between the second bifurcated end of the arm 174 as at 180. Further, expansion springs 182 corresponding to the springs 76 are connected between the members 178 and the arm 174 and the mount 170 includes an inclined portion 184 from whose upper free end an adjustable screw 186 corresponding to the screw 68 is threadedly supported. Also, an expansion spring 188 corresponding to the spring 70 is secured between the second bifurcated end of the arm 174 and the upper end of the inclined portion 184 of the mount 170.

The support arm 126 includes a laterally projecting flange 190 through which an abutment screw 192 is threaded and the screw 192 is provided with an adjustable abutment 194 thereon. The side portions 142 and 144 include aligned bores 196 formed therethrough for removably receiving an abutment pin 198 teethered to the side portion 142 as at 200.

When utilizing the second form of chain saw sharpener 110, the nose bar or blade 202 of a chain saw referred to in general by the reference numeral 204 is positioned within the channel portion 140 with the saw chain 206 in position on the bar 202. The screws 166 and 192 may be screwed inwardly toward the bar 202 until the abutments 168 and 194 thereof limit their inward movement and the inner ends of the screws 166 and 192 may then be utilized to position the bar 202 within the channel portion 140, the pin 198 also being inserted through the bore 196 and utilized to facilitate proper positioning of the bar 202 within the channel portion 140. After the bar 202 has been properly positioned, the hand wheel 154 is tightened in order to clamp the bar 202 between the clamp screw 152 and the abutments 148 in position within the channel portion 140. Thereafter, the screw 166 and 192 may be backed out to clear the teeth of the chain 206 and the shaft or pin 198 may be withdrawn from the bores 196. Of course, it will be noted that the support leg 156 may be swung to the operational position thereof illustrated in FIG. 5 and utilized in conjunction with the motor housing portion (not shown) of the chain saw 204 to support the latter as well as the sharpener 110 from any suitable horizontal support surface 210 such as a flooring surface or a workbench surface. Thereafter, the stop members 178 may be utilized to successively position opposite side cutting teeth of the chain 206 in proper position on the free end of the bar 202 of the chain saw 204 for engagement by the rotary grinding disk 122. Of course, the rotary grinding disk 122, through the pivotal mounting of the mount 112 from the support arm 126, may be swung from one side of the support arm 126 to the other for sharpening the teeth on opposite sides of the chain 206.

Figure 4:
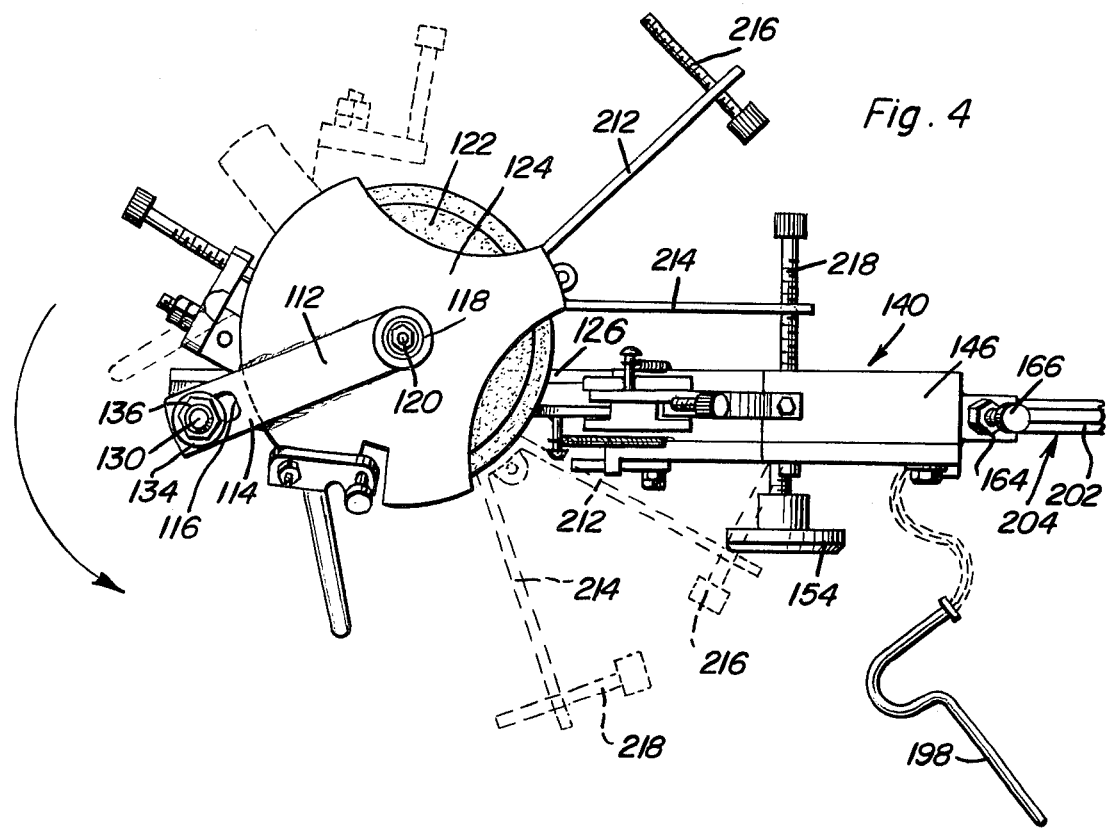
FIG. 4 is a top plan view of a second form of the saw chain sharpening machine.

With attention now invited more specifically to FIG. 4 of the drawings, it may be seen that the mount 112 includes a pair of outwardly divergent support arms 212 and 214 from which abutment screws 216 and 218 are threadedly supported. The abutment screw 218 is engageable with the side portion 144 to limit swinging movement of the mount 112 to the position thereof illustrated in solid lines in FIG. 4 of the drawings and the abutment screw 216 is engageable with the side portion 142 to limit swinging movement of the mount 112 in a counterclockwise direction as viewed in FIG. 4 to the phantom line position illustrated in that figure.

From a comparison of the above stated operations of the sharpeners 10 and 110, it may be seen that relative movement between the rotary grinding wheel of the sharpener being utilized and the associated chain tooth to be sharpened is the same. In the case of the sharpener 10, the arm 50 supporting the chain 58 is swung about the pivot axis defined by the shank 42 relative to the stationary support or mount 20 from which the disk 30 is journaled, and in the case of the sharpener 110, the nose bar 202 of the chain saw 204 supporting the chain 206 to be supported is maintained stationary and the axis or rotation of the rotary grinding disk 122 is swung about the pivot axis defined by the shank 130 between positions disposed on opposite sides of the support arm 126.

It is to be noted that the shaft 120 may be driven from a conventional electric drill. Further, a motor corresponding to the motor 26 may be mounted on the mount 112 in lieu of the journal sleeve 118 with the rotary output shaft of that motor serving as the shaft 120 upon which the rotary grinding wheel 122 is mounted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A chain saw sharpener, said sharpener including a mount, a rotary grinding member journalled from said mount for rotation about a first upstanding axis, a generally horizontal support arm, means oscillatably mounting said mount from one end of said support arm for angular displacement about a second axis generally paralleling and spaced to one side of said first axis, the other end of said support arm including chain saw bar support structure supported therefrom a chain saw bar nose end removably supported from said support structure with said bar generally paralleling said support arm and having its nose end facing toward said second axis and with at least the upper portion of said nose end exposed and the peripheral edges of said bar sufficiently free of adjacent obstructions to allow longitudinal shifting of a saw chain along said peripheral edges, said arm including depending support means for support from a support surface below said arm and adapted to support said nose end in slightly elevated position above said support surface when the end of the chain saw remote from said nose end rests upon said surface, the spacing between said second axis and said chain saw bar nose end being greater than the spacing between said axes and such to position angularly spaced peripheral portions of the side of said rotary grinding member remote from said second axis closely adjacent said nose end, and on opposite sides thereof, when said mount is swung to positions about said first axis closely adjacent opposite sides of a plane containing said second axis and generally paralleling said arm.

2. In combination with a generally horizontal chain saw including a bar having nose and drive motor ends, support structure removably supported from said bar intermediate its opposite ends and including a mounting portion spaced appreciably outwardly of said nose end, a mount, a rotary grinding member journaled from said mount for rotation about a first upstanding axis, means oscillatably supporting said mount from said mounting portion for oscillation about a second axis generally paralleling first axis, the spacing between said first and second axes being less than the spacing between said second axis and said nose end, said support structure including depending support means for support from a support surface therebelow and adapted to support said nose end in slightly elevated position above said support surface when the motor end of said bar rests upon said support surface.

3. The combination of claim 2 including a saw chain guidingly supported from said nose end of said bar for longitudinal shifting of at least a short lengthwise extending section thereof longitudinally of said bar, positioning means supported from said support structure and engageable with said section of chain to limit shifting of said section in at least one direction along said bar.

4. The combination of claim 2 wherein said means oscillatably supporting said mount from said mounting portion includes means operative to adjustably vary the spacing between said axes.

5. The combination of claim 2 wherein said mount and support structure include coacting means operative to adjustably limit the limits of oscillation of said mount relative to said mounting portion.

6. The combination of claim 3 wherein said positioning means includes swing arm means pivotally supported from said support structure for shifting between operative and inoperative positions and adapted to engage a tooth of said chain section to prevent movement of said tooth in said one direction.

7. The combination of claim 6 wherein said swing arm means includes a pair of swing arms supported in inclined positions, when in said operative positions, with their free swinging ends lowermost and the upper ends of said swing arms spaced above the elevation of said bar, said lowermost ends of said swing arms closely overlying said bar and disposed in side-by-side relation on opposite sides of the medial plane of said bar.

8. The combination of claim 7 including means yieldingly biasing said swing arms toward said operative positions.

9. The combination of claim 7 including a base mount shiftably supported from said support structure and including a portion thereof elevated above the level of said bar and shiftable lengthwise of said support structure, positioning means operatively connected between said base mount and said support structure for adjustably positioning said mount relative to said support structure, the upper ends of said swing arms being pivotally supported from said portion of said base mount.

* * * * *